United States Patent [19]
Hoguchi

[11] Patent Number: 5,363,714
[45] Date of Patent: Nov. 15, 1994

[54] GEAR PRODUCT

[75] Inventor: Tetsuya Hoguchi, Toyota, Japan

[73] Assignee: O-Oka Forge Co., Ltd., Nagoya, Japan

[21] Appl. No.: 3,462

[22] Filed: Jan. 12, 1993

[30] Foreign Application Priority Data

Jan. 14, 1992 [JP] Japan .................. 4-024819

[51] Int. Cl.$^5$ .................. F16D 23/06; B21K 1/30
[52] U.S. Cl. .................. 74/432; 29/893.34; 192/53 F; 192/108
[58] Field of Search .................. 74/431, 432; 192/53 F, 192/108; 29/893.34

[56] References Cited

U.S. PATENT DOCUMENTS

| | | | |
|---|---|---|---|
| 3,219,164 | 11/1965 | Henyon | 192/108 X |
| 4,938,089 | 7/1990 | Ohoka | 192/53 F X |

FOREIGN PATENT DOCUMENTS

| | | | |
|---|---|---|---|
| 37-16831 | 10/1961 | Japan | 29/893.34 |
| 58-175846 | 11/1983 | Japan . | |
| 61-3628 | 1/1986 | Japan | 29/893.34 |
| 64-22442 | 1/1989 | Japan . | |
| 1-241349 | 9/1989 | Japan . | |
| 2-153021 | 6/1990 | Japan | 29/893.34 |
| 2-217656 | 8/1990 | Japan | 74/431 |

Primary Examiner—Allan D. Herrmann
Attorney, Agent, or Firm—LaHive & Cockfield

[57] ABSTRACT

The present invention provides a novel gear product including plural gear members of different tooth profiles and configurations, which are manufactured integrally through forging process. The forged gear product of the invention is compact and light in weight while having a sufficient strength. The gear product includes a clutch spline member with clutch spline teeth and a helical gear member with spiral teeth, which are integrally forged and continuously arranged in the axial direction to be adjacent to each other without any clearance therebetween.

12 Claims, 11 Drawing Sheets

GEAR PRODUCT

BACKGROUND OF THE INVENTION

1. Field of the Invention

The present invention relates to a gear product including a set of coaxial gear members which have different tooth profiles and configurations and are formed continuously without any clearance therebetween to be adjacent to each other directly or via a flange. An example of such gear product includes a gear component having synchronous clutch spline teeth used for a transmission mechanism.

2. Description of Related Art

Such gear product is typically manufactured according to either of the following two methods: (1) combining or joining separately forged plural gear members; and (2) forging gear material into an integral body consisting of plural gear members. In either method, tooth arrangements on the gear members are generally formed and finished by machining although part of the teeth may be formed through forging process. Especially, spiral tooth profile of a helical gear can not be formed by forging and should always be formed by machining.

The gear product manufactured by the above method (1) has several drawbacks as below:

(a) Manufacturing processes are rather complicated;
(b) The yield is unfavorably low; and
(c) It is substantially impossible to make the gear product compact and light in weight since each gear member is manufactured to have a required strength.

When teeth on the gear member are formed through machining, the proper fiber structure of gear material is undesirably cut off at the machined part to decrease the strength thereof. Machining the gear member requires a sufficient clearance on either side of its tooth arrangement to receive a machining tool and complete the machining, thus preventing the whole gear product from being made compact and light in weight. Teeth formed through machining further requires chamfering process.

There has, accordingly, been a strong demand for a gear product including plural gear members manufactured integrally by forging. Such demand has, however, not been realized due to some technological difficulties. In other words, conventional forged gear products including plural gear members are not of practical use.

SUMMARY OF THE INVENTION

One object of the invention is to provide a novel gear product including plural gear members of different tooth profiles and configurations, which are manufactured integrally by forging process.

Another object of the invention is to provide a novel forged gear product which is made compact and light in weight.

A further object of the invention is to provide a novel forged gear product including plural gear members which are adjacent to each other directly or via a flange to attain a sufficient strength.

The above and other related objects are realized by a gear product of the invention including a set of coaxial gear members, which have different tooth profiles and configurations and are disposed in axial succession and are in intimate facing contact with each other, thereby having no clearance therebetween and be adjacent to each other directly or via a flange. The set of gear members include a helical gear member with a spiral tooth profile and a clutch spline member with a straight tooth profile.

In the gear product of the invention, plural gear members are integrally forged and continuously arranged without any clearance therebetween to be adjacent to each other directly or via a flange. This forged gear product of the invention does not require any clearance on either side of each tooth arrangement, which is essential for conventional machined gear members, thus allowing the axial length thereof to be favorably shortened. The fiber structure of gear material is not undesirably cut off but runs continuously to ensure a sufficient strength. The plural gear members adjacent to each other directly or via a flange reinforce the whole gear product to further improve the strength thereof. The gear product of the invention is thus made compact and light in weight. Even a chamfered part is formed without machining by previously setting in a forging die.

The above and other objects, features, aspects, and advantages of the present invention will become more apparent from the following detailed description of the preferred embodiment with the accompanying drawings.

BRIEF DESCRIPTION OF THE DRAWINGS

FIG. 13, which includes

FIG. 14, which includes

DESCRIPTION OF THE PREFERRED EMBODIMENTS

The invention is described more in detail based on plural embodiments, each including two gear members having different tooth profiles and configurations.

Figure 7:
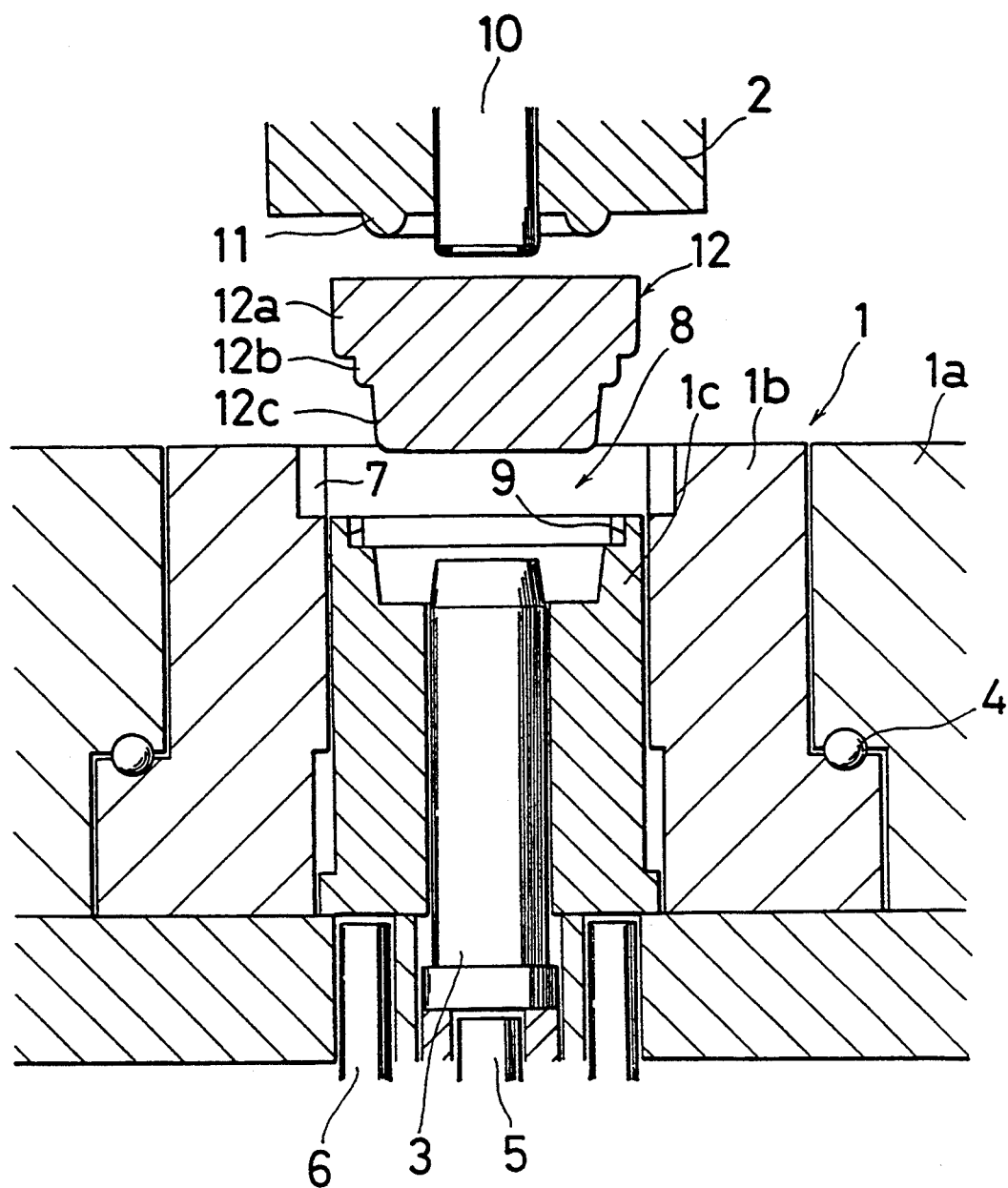
FIG. 7 is a schematic cross-sectional view showing a forging die used for producing the gear product of FIG. 1.

A forging die for producing a gear product of a first embodiment is shown in FIG. 7. The forging die includes a lower die member 1 and a vertically movable upper die member 2. The lower die member 1 further includes: a base 1a; an outer cylinder 1b rotatable relative to the base 1a; a vertically movable inner cylinder 1c fitted in and arranged coaxially with the outer cylinder 1b, and a punch 3 disposed on the center of the inner cylinder 1c. The base 1a and the outer cylinder 1b are coupled with each other via a pair of bearings 4. A knock-out pin 5 is disposed below the punch 3 while a pair of tubular knock-outs 6 being arranged below the inner cylinder 1c. The inner surface of the upper end of the outer cylinder 1b is provided with a series of grooves 7 for producing spiral teeth (hereinafter referred to as helical grooves 7). The inner surface of the upper end of the inner cylinder 1c is provided with a series of grooves 9 for producing synchronous clutch spline teeth (hereinafter referred to as clutch spline grooves 9). The upper die member 2 includes: a punch 10 disposed on the center thereof to be movable downward, and a protrusion ring 11 surrounding the punch 10.

Figure 8:
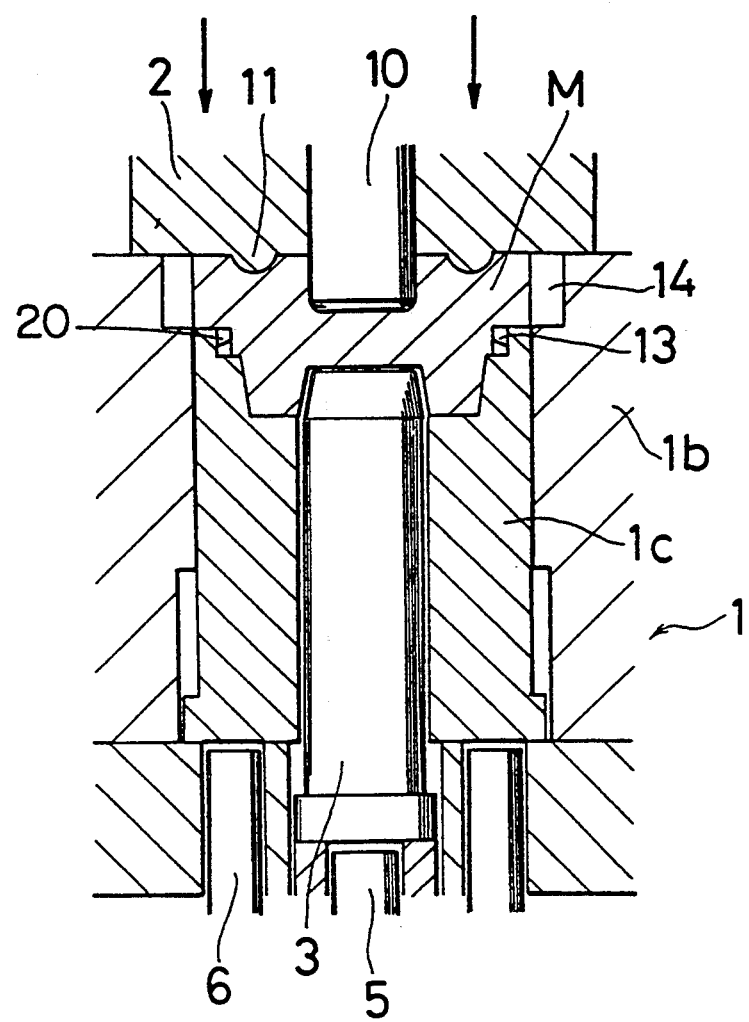
FIG. 8 shows a forging process for producing the gear product of FIG. 1.

A gear material 12 is placed in between the upper die member 2 and the lower die member 1 as clearly seen in FIG. 7. While the upper die member 2 is moved downward, the gear material 12 is pressed into a cavity 8 defined by the outer cylinder 1b and the inner cylinder 1c. The gear material 12 includes a larger diametral section 12a, a smaller diametral section 12b, and a smallest-diametral boss section 12c continuously formed in this order. When the gear material 12 is pressed into the cavity 8, clutch spline teeth 13 are formed on the circumference of the smaller diametral section 12b by the clutch spline grooves 9. The gear material 12 is further pressed against the punches 3 and 10 and the protrusion ring 11 to expand radially, and spiral teeth 14 are formed on the circumference of the larger diametral section 12a by the helical grooves 7 as shown in FIG. 8. Recesses formed in the gear material 12 by the punches 3 and 10 are subsequently worked into a shaft hole. A recess formed by the protrusion ring 11 contributes to weight reduction of a final gear product M.

Since the tooth profiles and configurations of the clutch spline teeth 13 and the spiral teeth 14 are freely determined by changing the shape and arrangement of the helical grooves 7 and the clutch spline grooves 9, chamfering or other post-work can be omitted by previously setting required work in the grooves 7 and 9. In the embodiment, guide chamfers 20 are simultaneously formed on first ends of 13a of the clutch spline teeth 13.

Figure 1:
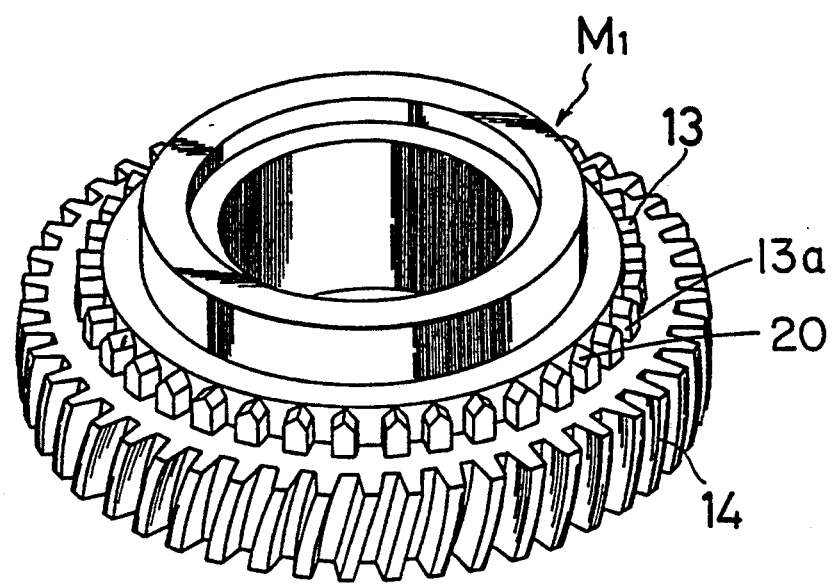
FIG. 1 is a perspective view illustrating a gear product embodying the invention.
Figure 3:
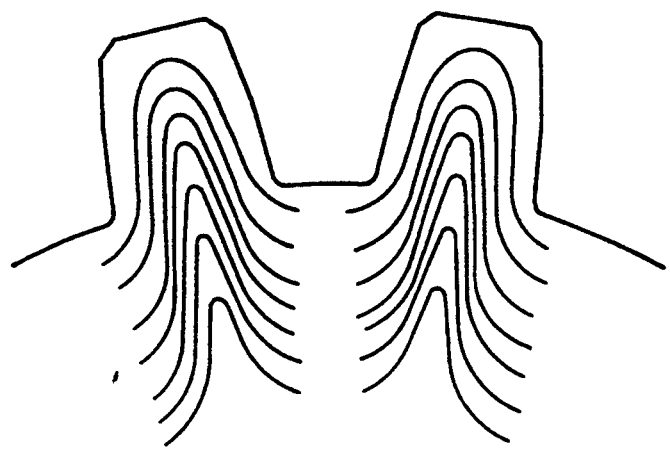
FIG. 3 shows a flow of a fiber structure in a tooth profile.

In the embodiment, the cavity 8 is completely blocked by the lower die member 1 and the upper die member 2, and the shape and size of the gear material 12 is previously determined corresponding to those of a desirable final gear product. FIG. 1 shows a final gear product M1 produced through only one step with the forging die described above. The gear product M1 includes the clutch spline teeth 13 and the spiral teeth 14, which are coaxially arranged without any clearance therebetween. Both the teeth 13 and 14 have fiber structure continuously running without any cut as shown in FIG. 3, thus having a sufficient strength.

Figure 2:
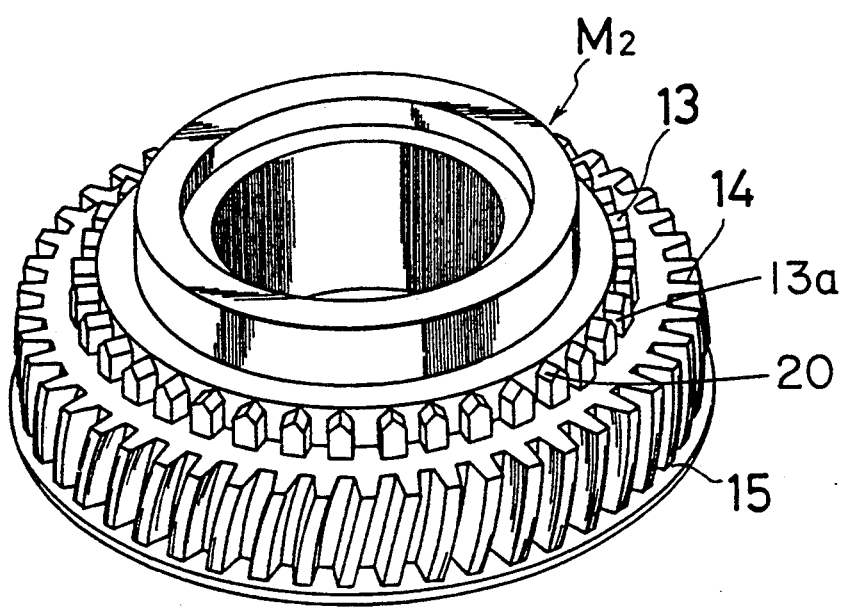
FIG. 2 is perspective view illustrating a gear product according to another embodiment of the invention.
Figure 11:
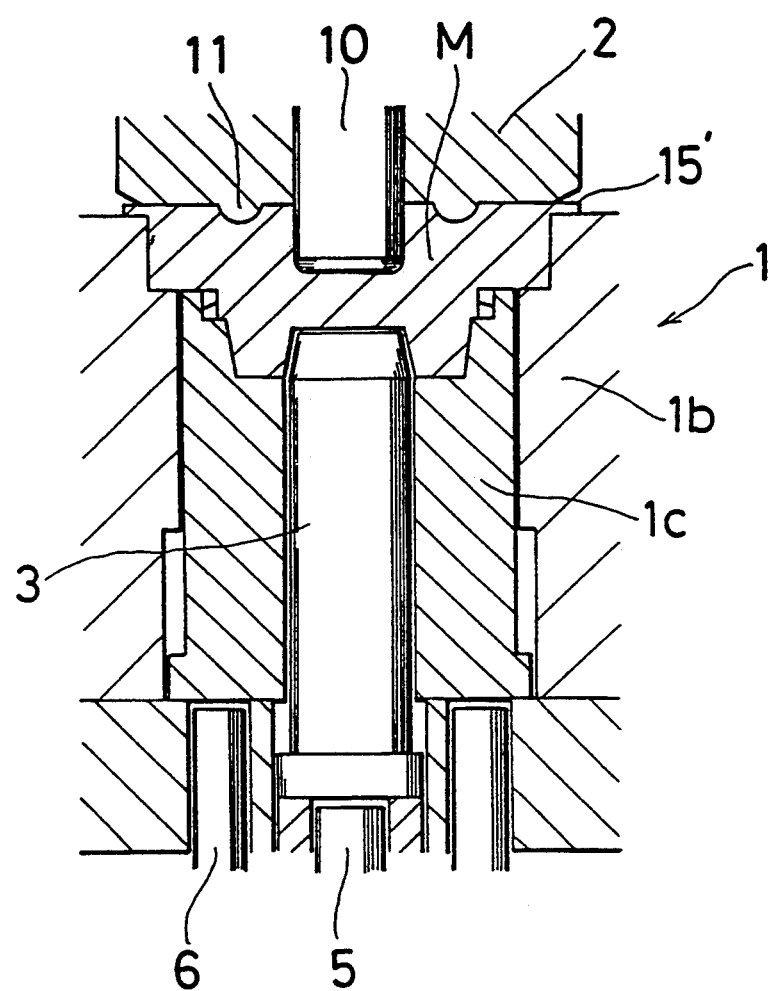
FIG. 11 shows a forging process for producing the gear product of FIG. 2.

A stopper is occasionally formed on the circumferential end of the spiral or helical teeth to ensure secure engagement and prevent accidental fall-out. In such a case, a gear product M with a stopper is produced with another forging die, in which a cavity 8 is not completely blocked by a lower die member 1 and an upper die member 2, as shown in FIG. 11. The gear product M has a fin 15' formed between the lower die member 1 and the upper die member 2. FIG. 2 shows a gear product M2 having a stopper flange 15, which is integrally formed and arranged coaxially with the spiral teeth 14 without any clearance. In the gear product M2, the flange 15 formed integrally with the spiral teeth 14 further improves the strength of the spiral teeth 14. Such improvement of the strength as well as continuous flow of the fiber structure shown in FIG. 3 drastically enhances the durability of the gear product M2.

The spiral teeth 14 of the gear product M1 can be formed by machining although the strength thereof is not sufficiently high. However, the spiral teeth 14 having a stopper flange 15, as in the case of the gear product M2, cannot be manufactured by a conventional machining process.

Figure 9:
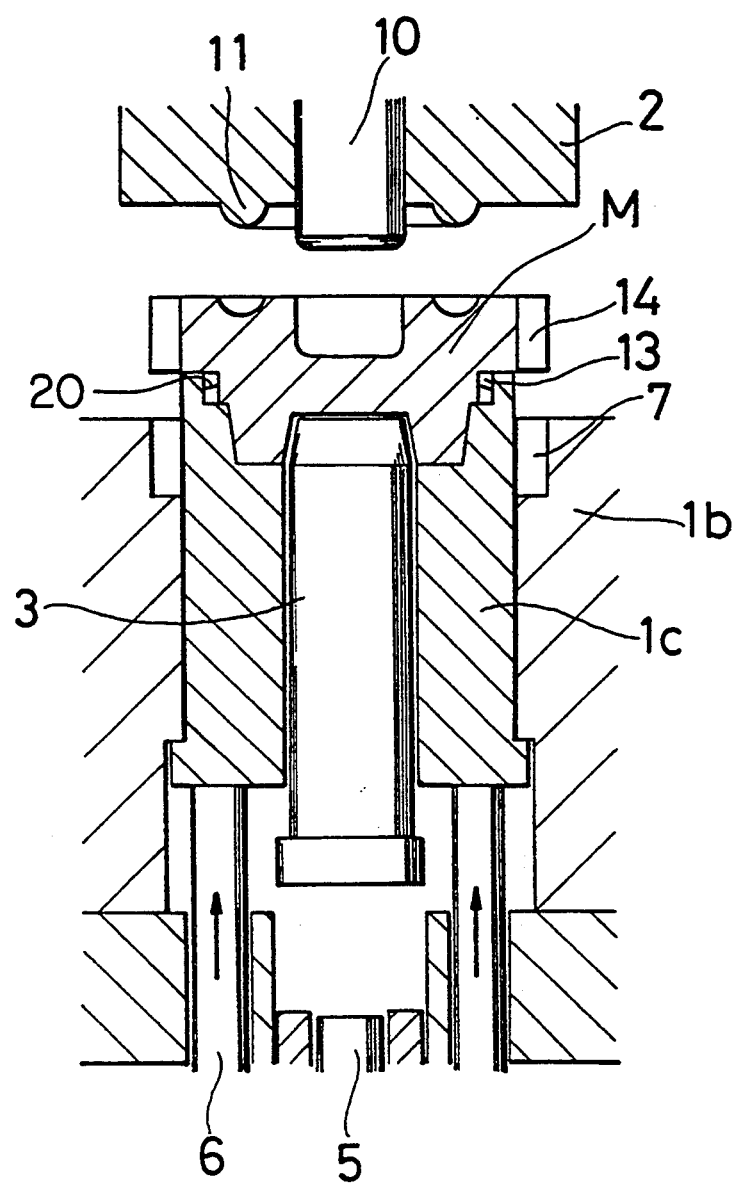
FIG. 9 shows a forging process for producing the gear product of FIG. 1.

After forging the gear material 12 into the gear product M, the upper die member 2 is moved upward and separated from the lower die member 1 as seen in FIG. 9. The pair of tubular knock-outs 6 are pressed upward as shown by the arrows of FIG. 9 to move the inner cylinder 1c with the gear product M upward. Here the gear product M is taken out of the outer cylinder 1b while the outer cylinder 1b rotates relative to the base 1a by an amount corresponding to a tilt angle of the spiral teeth 14. The gear product M is thus taken out in the vertical direction without any rotation. Since the gear product M is lifted vertically, the bearings 4 disposed between the base 1a and the outer cylinder 1b are preferably arranged in a substantially horizontal plane as clearly seen in FIG. 7. This horizontal arrangement reduces a load applied onto the bearings 4 under the pressing conditions.

Figure 10:
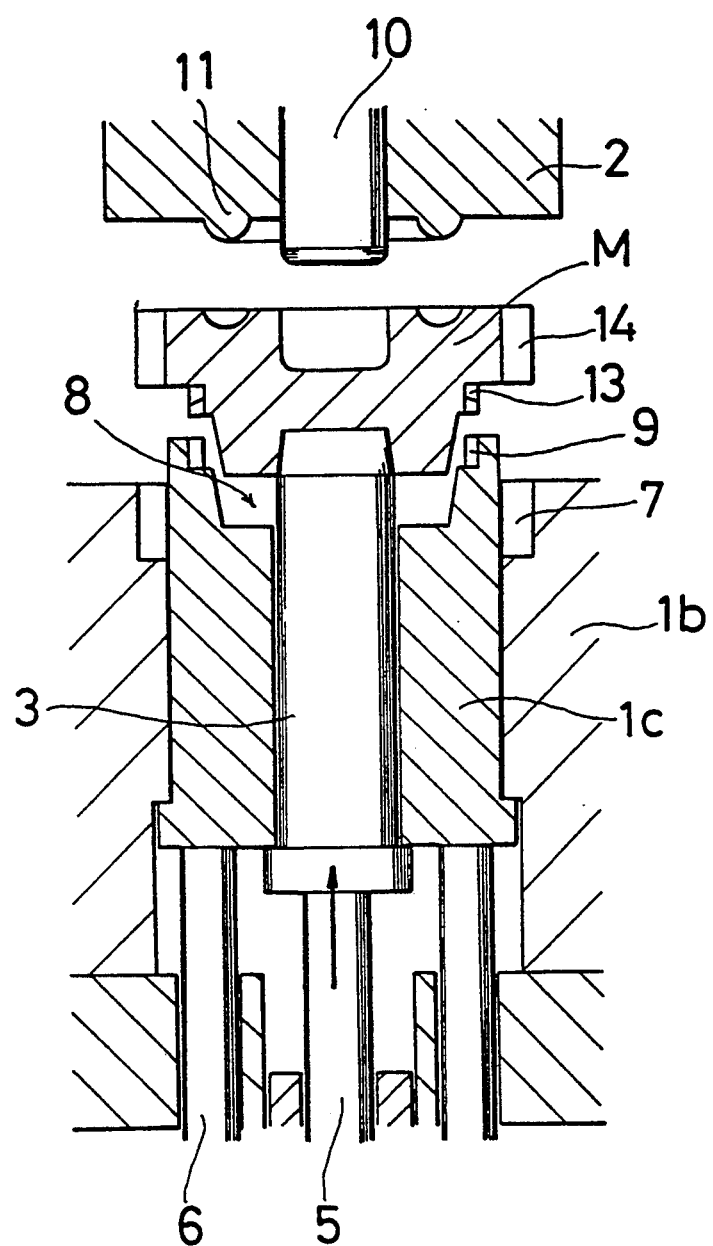
FIG. 10 shows a forging process for producing the gear product of FIG. 1.

The knock-out pin 5 is then pressed upward as shown in FIG. 10, and the gear product M supported by the upper end of the punch 3 is taken out of the cavity 8.

In the gear product M1 or M2 of the first embodiment, the spiral teeth 14 and the clutch spline teeth 13 do not overlap each other in the axial direction. Modification of the forging die, however, allows manufacture of another gear product including spiral teeth and clutch spline teeth which overlap each other and are continuously arranged without any clearance in the axial direction.

Figure 4:
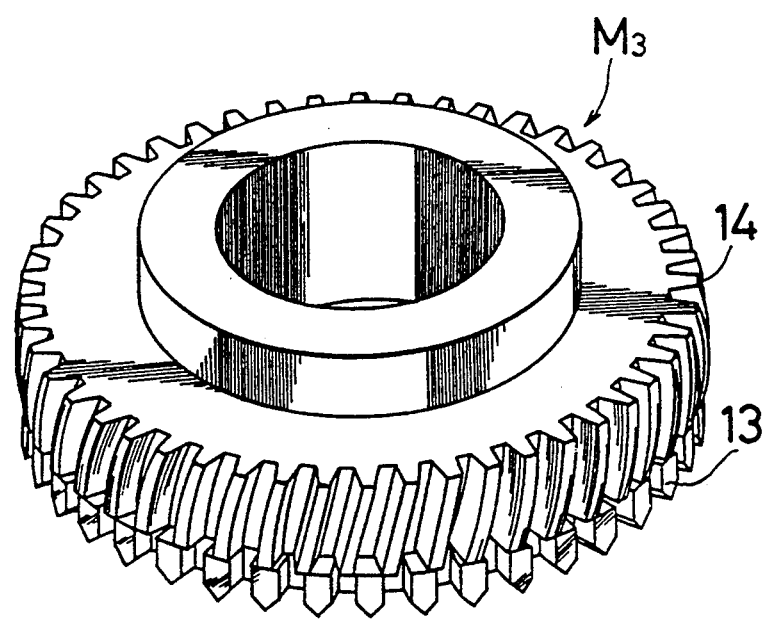
FIG. 4 is a perspective view illustrating a gear product according to still another embodiment of the invention.
Figure 12:
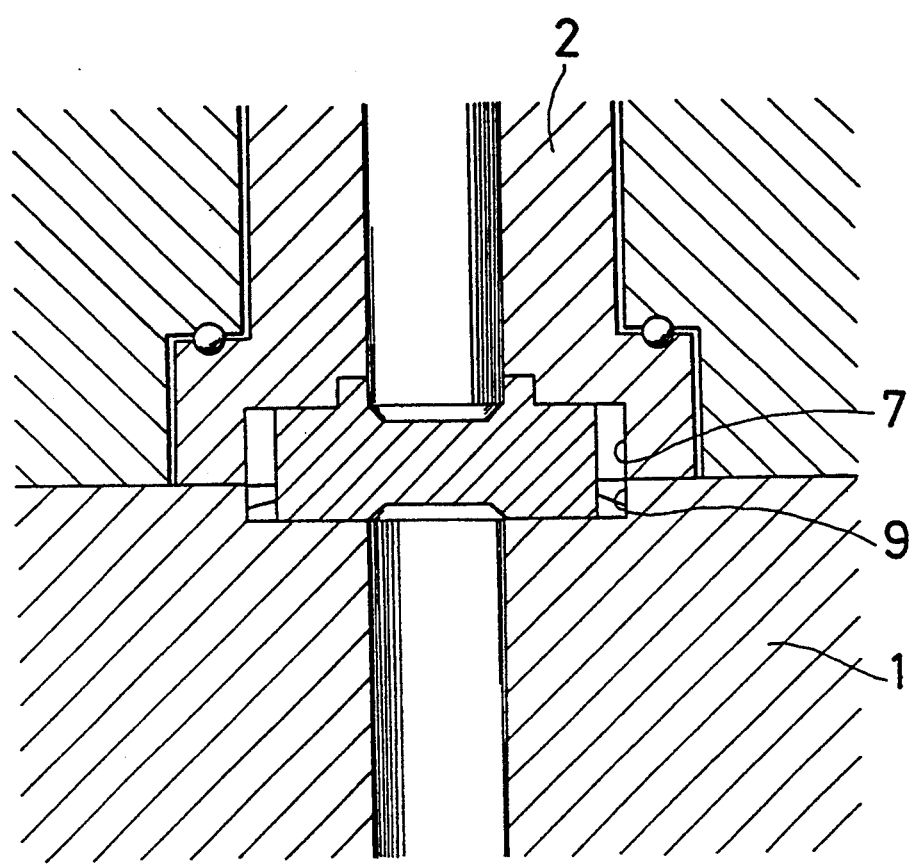
FIG. 12 shows a forging process for producing the gear product of FIG. 4.
Figure 13A:
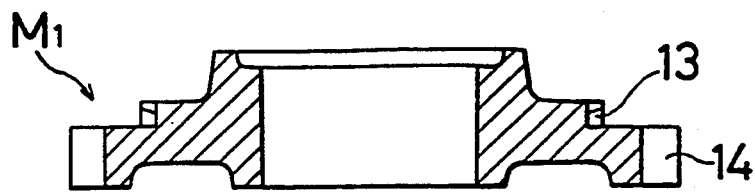
FIGS. 13A–13H, shows examples of modification.
Figure 13B:
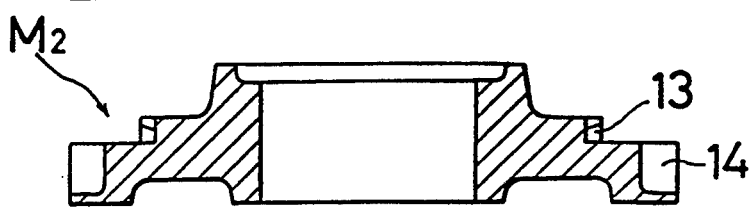
Figure 13C:
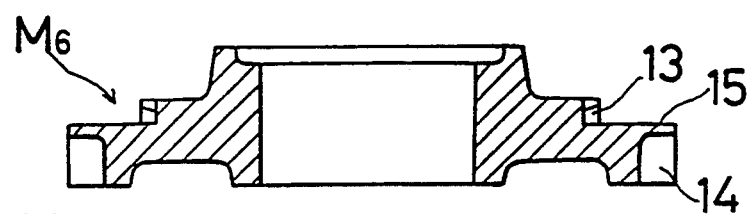
Figure 13D:
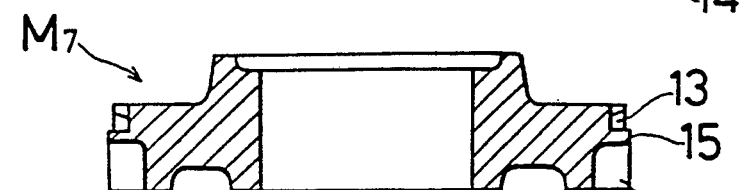
Figure 13E:
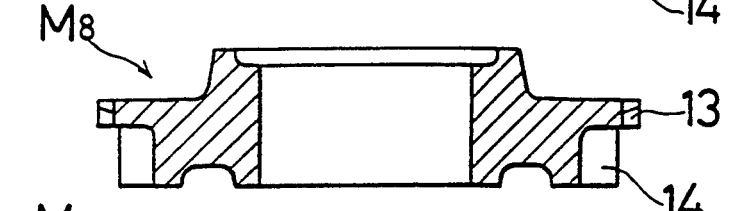
Figure 13F:
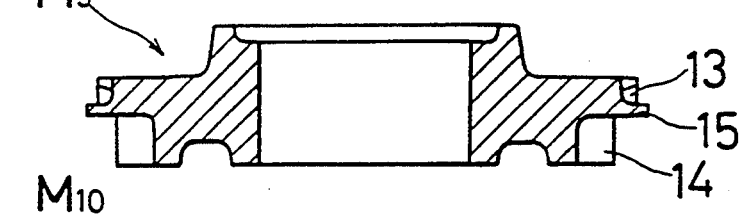
Figure 13G:
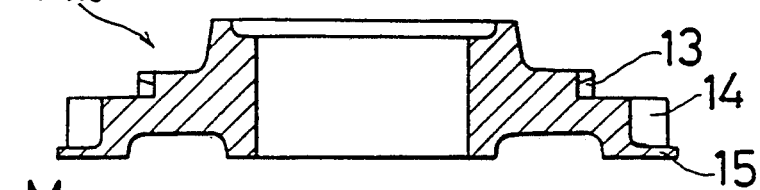
Figure 13H:
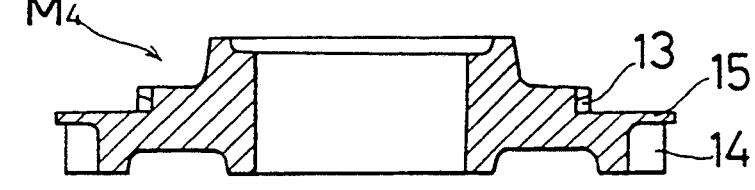
Figure 14A:
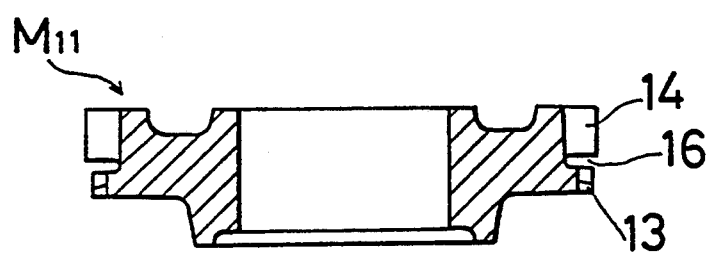
FIGS. 14A–14D, shows examples of gear products which are modified to have a clearance as conventional products.
Figure 14B:
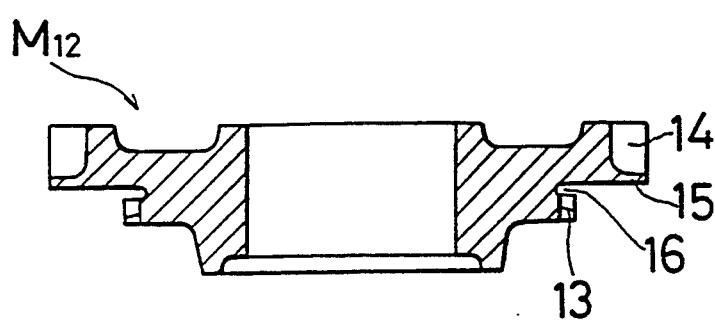
Figure 14C:
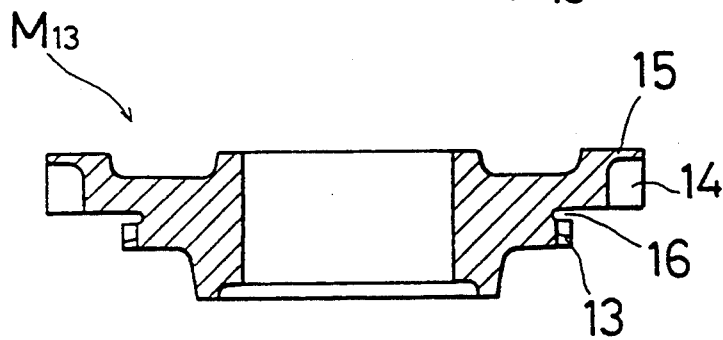
Figure 14D:
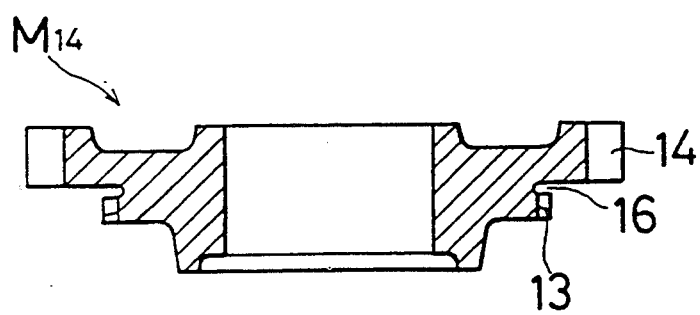

In a second embodiment, a forging die as shown in FIG. 12 is used, in which die members 1 and 2 respectively have grooves at similar positions in the radial direction. In the forging die of FIG. 12, for example, the lower die member 1 has clutch spline grooves 9 while the upper die member 2 having helical grooves 7. The clutch spline grooves 9 and the helical grooves 7 are disposed to have similar radii from the axial center. The upper die member 2 with the helical grooves 7 is rotatable relative to the lower die member 1. FIG. 4 shows a final gear product M3 produced with the forging die of FIG. 12. The gear product M3 of FIG. 4 has spiral teeth 14 continuously overlapping with clutch spline teeth 13, thus having an extremely high strength. Gear products having such features could not have been mass-produced by any means.

Figure 5:
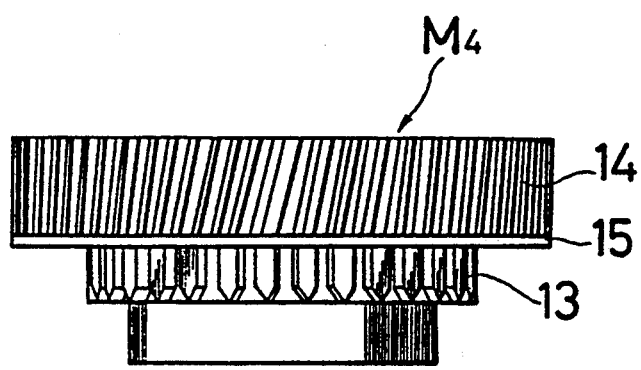
FIG. 5 is a side view illustrating a gear product according to another embodiment of the invention.

When the forging die is modified in the same manner as the first embodiment, a fin may be formed between two types of teeth. FIG. 5 shows a final gear product M4 having such features, in which a stopper flange 15 is integrally formed in between spiral teeth 14 and clutch spline teeth 13.

Figure 6:
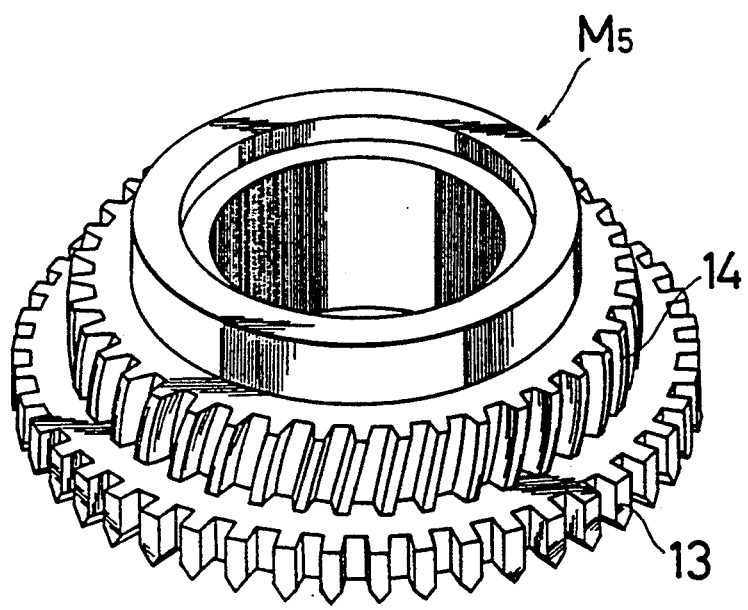
FIG. 6 is a perspective view illustrating a gear product according to another embodiment of the invention.

An example of other modifications is shown in FIG. 6. A gear product M5 of FIG. 6 has clutch spline teeth 13 on a larger diametral section and spiral teeth 14 on a smaller diametral section. A stopper flange may also be formed between the teeth 13 and 14 in this case.

The invention may be changed, varied, or modified in many forms and ways other than those mentioned above without departing from the scope or spirit of essential characteristics thereof. The most essential feature of the gear product of the invention is that gear members with different types of teeth are integrally forged and continuously arranged without any clearance therebetween to be adjacent to each other directly or via a flange. Typical examples of gear products of the invention including those mentioned above are schematically shown in FIG. 13. These gear products which are compact and light in weight and have sufficient strength can be mass-produced at a relatively low cost.

Although all the gear products of the above embodiments have gear members with two different types of tooth profiles, that is, a helical tooth profile and a straight tooth profile, the gear product may have a plurality of helical gear members having helical tooth profiles or a plurality of helical gear members having straight tooth profiles. The gear product may also have three or more gear members with teeth as long as a smaller diametral member is not placed between larger diametral members. The position of the flange as well as the number, diameter, thickness and module of teeth may be changed as occasion demands.

Typically, there is no clearance between gear members or a gear member and a flange in the gear product of the invention. However, the gear product of the invention may have a clearance 16 between plural gear members as shown in FIG. 14 as occasion demands. FIG. 14 shows only some examples M11 through M14 of such modifications. These modified gear products are favorably applicable to a device which has been used with a conventional gear product having a clearance.

What is claimed is:

1. A gear product comprising a plurality of gear members having different tooth profiles around a periphery thereof and a flange, said gear members and said flange being coaxially arranged and integrally forged, and in intimate contact with each other and free of a clearance therebetween.

2. A gear product in accordance with claim 1, in which said gear members comprise
    A. a helical gear member having a spiral tooth profile, said spiral tooth profile having a first end, and
    B. a clutch spline member having a straight tooth profile, said straight tooth profile having a first end.

3. A gear product in accordance with claim 2, in which said clutch spline member has teeth having guide chamfer means on one end thereof.

4. A gear product in accordance with claim 2, wherein said flange is integrally formed with said helical gear member.

5. A gear product in accordance with claim 4, wherein said flange is interposed between said helical gear member and said clutch spline member.

6. A gear product in accordance with claim 4, wherein said clutch spline member has a first face and a second face and said helical gear member has a first face and a second face, said second face of said clutch spline member being in intimate contact with said first face of said helical gear member, said flange being formed on said second face of said helical gear member.

7. A gear product in accordance with claim 1, in which at least one of said gear members has teeth having chamfer means on one end thereof.

8. An integrally forged gear product comprising
    a smallest-diametral boss member,
    a smaller-diametral member with clutch spline teeth, said smaller-diametral member having a first end, and
    a larger-diametral member with spiral or helical teeth, said larger-diametral member having a first axial end, and
    a flange,
    wherein said smallest-diametral boss member, said smaller-diametral member, said larger-diametral member, and said flange are in axial succession and in intimate contact with each other and free of any clearance therebetween.

9. An integrally forged gear product in accordance with claim 8, in which each said clutch spline teeth has guide chamfer means disposed on said first end thereof.

10. An integrally forged gear product comprising
    a first member of a first diameter having clutch spline teeth,
    a flange, and
    a second member of a second diameter similar to said first diameter having spiral or helical teeth,
    wherein said first member, said flange, and said second member are in axial succession and in intimate contact with each other and free of any clearance therebetween.

11. An integrally forged gear product comprising
    a smallest-diametral boss member,
    a smaller-diametral member with helical or spiral teeth, said smaller-diametral member having a first end,
    a flange, and
    a larger-diametral member with clutch spline teeth, said larger-diametral member having a first end,
    wherein said smallest-diametral boss member, said smaller-diametral member, said flange, and said larger-diametral member are in axial succession and in intimate contact with each other and free of any clearance therebetween.

12. An integrally forged gear product in accordance with claim 11, in which each said clutch spline teeth has guide chamfer means disposed on said first end thereof.

* * * * *